(12) United States Patent
Havens

(10) Patent No.: US 6,947,385 B2
(45) Date of Patent: *Sep. 20, 2005

(54) CHANGING QUALITY OF SERVICE FOR VOICE OVER IP CALLS

(75) Inventor: Eric Havens, Prosper, TX (US)

(73) Assignee: Ericsson Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/807,939

(22) Filed: Mar. 24, 2004

(65) Prior Publication Data

US 2004/0184446 A1 Sep. 23, 2004

Related U.S. Application Data

(63) Continuation of application No. 09/465,070, filed on Dec. 16, 1999, now Pat. No. 6,735,175.

(51) Int. Cl.[7] .......................... G01R 31/08; H04L 12/66; H04L 12/28
(52) U.S. Cl. .......................... 370/236; 370/352; 370/410
(58) Field of Search .................................. 370/352–356, 370/410, 465, 401, 467, 236, 468; 379/93.01, 88.17; 709/227, 228, 230, 238

(56) References Cited

U.S. PATENT DOCUMENTS

| 6,515,985 B2 | * | 2/2003 | Shmulevich et al. | ........ 370/356 |
| 6,597,702 B1 | * | 7/2003 | Caugherty | .................. 370/410 |
| 6,832,254 B1 | * | 12/2004 | Scoggins et al. | ........... 709/227 |

* cited by examiner

*Primary Examiner*—Duc Ho

(57) ABSTRACT

Methods and/or systems for changing the quality of service (QoS) and/or type of service for voice over IP communications. A system for changing quality of service for voice over IP communications includes a signal monitoring module for monitoring subscriber inputs representing requests for a QoS change; and a controller for implementing subscriber inputs representing requests for a QoS change. A method for changing the quality of service (QoS) during an ongoing voice over IP communication is featured. A subscriber line is monitored for a subscriber originated request for a change in QoS. When a request is received, QoS of a subscriber communication is converted utilizing codec algorithms.

17 Claims, 2 Drawing Sheets

CHANGING QUALITY OF SERVICE FOR VOICE OVER IP CALLS

This application is a continuation of U.S. patent application Ser. No. 09/465,070, filed on Dec. 16, 1999, now U.S. Pat. No. 6,735,175 the disclosures of which are incorporated herein by reference.

TECHNICAL FIELD OF THE INVENTION

The present invention is related to telecommunications. More particularly, the present invention is related to methods for changing quality of service for Voice over IP communications.

BACKGROUND

Information technology (IT) and Communication Networks (Networks) provide end users with access to communications and diverse media. Typical Networks include, for example: PSTN (Public Switched Telephone Network), IP-based (Internet Protocol, or Internet), ISDN (Integrated Services Digital Network), and PLMN (Public Land Mobile Network). Networks provide end users with diverse applications such as: wired and wireless voice, multimedia access/transmission, Internet access, Voice over IP (Internet Protocol), etc. Access to and communication over Networks is accomplished via hardware (e.g, switches, routers, servers, gateways, gateway controllers, etc.). and communications protocols (e.g., IP (Internet Protocol), RLP (Radio Link Protocol), ATM (Asynchronous Transfer Mode), GSM (Global System for Mobile Communication), CDMA (Code Division Multiple Access), TDMA (Time Division Multiple Access), RTP ( ), SS7 (Signaling System 7), SIP (Session Initiation Protocol), MGCP (Media Gateway Control Protocol), etc.).

A Network link may generally be set up by using access technology, such as PRA (Primary Rate Access) signaling or ISUP (ISDN user part). Functionality to set up links between, for example, a Media Gateway (MG) and the Internet, normally reside on a separate hardware component such as an Access Server (AS). Once the AS gets signaled by the Mobile Switching Center (MSC), an incoming communication requesting access is directed from the MSC towards the Media Gateway Controller (MGC). Once the MGC gets signaled via a communication requesting Internet access, the MGC seizes AS functionality.

Internet applications such as IA (Internet Access), VoIP (Voice over IP) and Multimedia generally require certain functionality such as contained within a MGC to control the media stream in the MG as well as other Internet specific functionality such as AAA (Authentication, Authorization, Accounting).

Networks access and operational inefficiencies generally occur because of bandwidth limitations or hardware clashes. For example, a traditional telephone call is established over a dedicated network circuit (e.g., Public Service Telephone Network, or "PSTN"). Regardless of the amount of voice data (e.g., analog voice signals) to be transferred across the circuit connection (e.g., via the PSTN), the entire circuit must generally be dedicated for the duration of the call; thus resulting in a potentially low overall usage of switching resources. An alternative to circuit switched (voice) calls is packet switched calls (e.g., voice over IP). In a packet switched call, the voice data is encoded into packets which are then directed across a network and reassembled into an approximation of the original data at the receiving end. During a silent period of a call, no data generally needs to be packetized and transmitted across the network; thus saving network resources and allowing for higher call density (e.g., more calls can be routed on the same amount of network resources).

In order for a call to be sent over a packet-switched network, the voice data (e.g., analog voice signals) must be sampled and converted into a digital format (e.g., packetized voice). The sampling process introduces a trade-off between sound quality and bandwidth utilization. A voice stream can generally be sampled very frequently to produce very high sound quality on the receiving end, but at the cost of using a large amount of bandwidth to transport generated packets. Alternatively, voice can be sampled infrequently to produce a smaller amount of packet data but at the cost of low sound quality at the receiving end.

As part of setting up a call over a packet network, a codec (coding/decoding algorithm) must generally be specified to control what rate of sampling is used to encode the call. Depending on the codec algorithm specified, various levels of voice quality/bandwidth utilization can be generally achieved.

There is apparently a lack of available methods and systems for a caller making a call on a voice over IP network to specify, during a call, a level of voice quality or Quality of Service (QoS) that is desired. While the network operator can generally specify at initial call setup or even in mid-call what quality level will be used, the caller apparently cannot. Such a lack of user control over QoS precludes the network operator from offering low Quality of Service (QoS) at a low cost while still allowing the caller to upgrade to a higher QoS at a higher cost as needed during, or for the remaining duration of, a voice communication.

SUMMARY OF THE INVENTION

Aspects of the present invention provide methods and/or systems whereby a subscriber making a call on a Voice over IP network can choose a QoS during an ongoing voice communication, and may be realized over numerous network configurations so long as the configuration provides for: packetization of voice streams over an IP network using a codec; codec choices; the ability to change a codec in use during an ongoing call; and the ability for the caller to signal the network (e.g., through in-band DTMF (dual tone multifrequncy) commands via digit collection and/or through a flash feature) when a change of codec (coder/decoder) algorithm is desired.

One aspect of the invention provides a method for changing QoS for voice over IP communication wherein caller invoked signaling of a network controller indicates that a change in QoS is desired during an ongoing voice over IP communication; and system implementation of a change in QoS is provided through packetization or depacketization of a communication in response to the caller invoked signaling.

Another aspect of the present invention provides a system for changing QoS for voice over IP communications. A signal monitoring module for monitoring subscriber inputs representing requests for a QoS change; and a controller for implementing subscriber inputs representing requests for a QoS change.

DETAILED DESCRIPTION OF PREFERRED EMBODIMENTS

Figure 1:
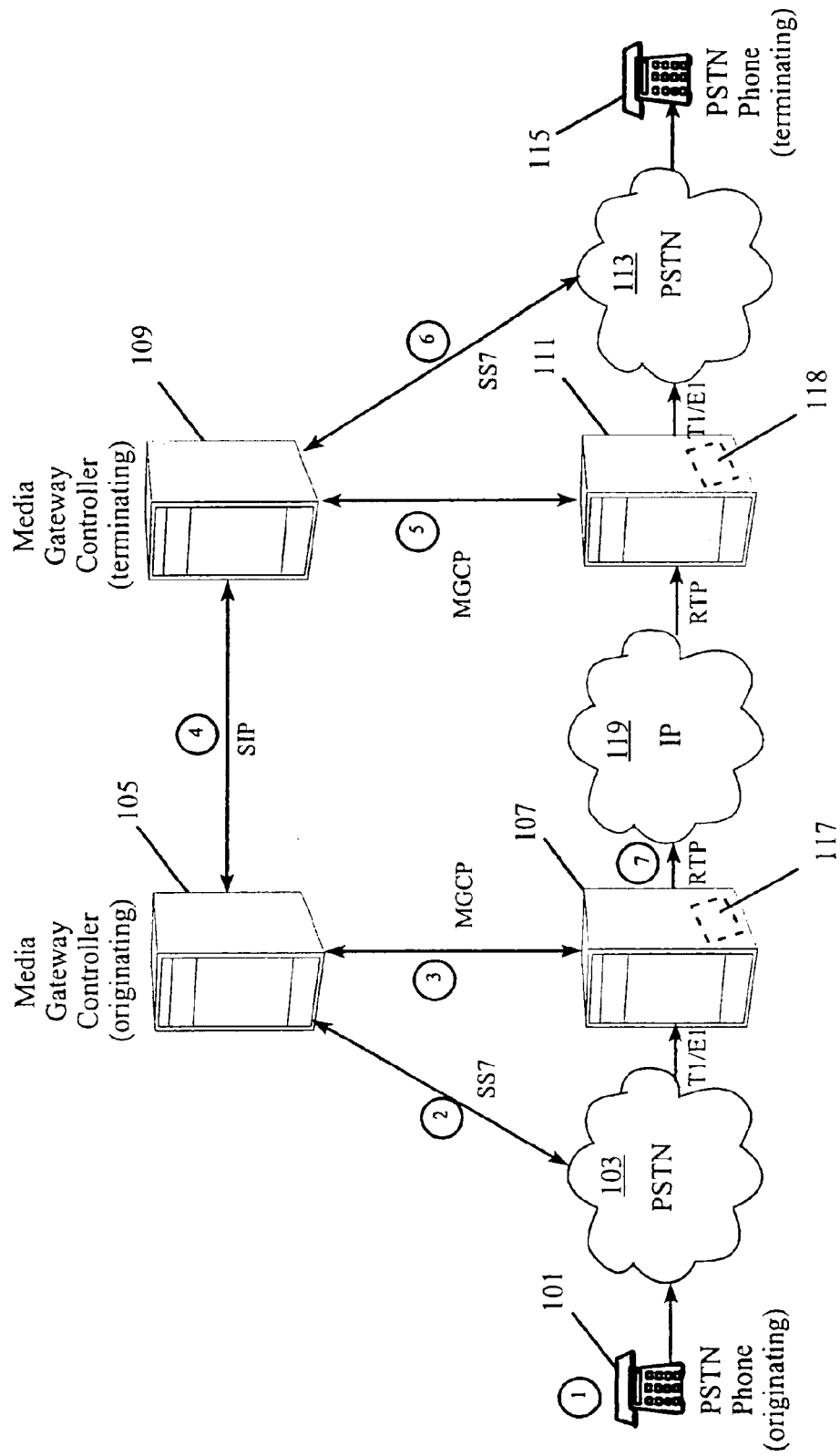
FIG. 1 illustrates voice over IP call flow and environment.

Referring to FIG. 1, both the signaling and voice paths for a typical voice (e.g., PSTN-based communication) over IP (e.g, data network-based communication) phone call are illustrated. It should be appreciated that PSTN is referred to herein by example only and should not be taken as a limitation of the voice communication aspects invention.

Referring to FIG. 1, the following numbered events generally occur during the creation of a voice over IP (VOIP) call:

1. A user dials a number from the originating PSTN phone 101.
2. The PSTN network 103 on the originating side signals (e.g., using the SS7 signaling protocol) the originating Media Gateway Controller (MGC) 105 that a VOIP connection is requested.
3. The originating MGC 105 signals (e.g., using the Media Gateway Control Protocol (MGCP)) the originating Media Gateway (MG) 107 instructing it to allocate encoding and IP resources to handle the originating side of the call.
4. The originating MGC 107 signals (e.g., Session Initiation Protocol (SIP)) the terminating MGC 109 to set up the terminating side of the call.
5. The terminating MGC 109 signals (MGCP) the terminating MG 111 instructing it to allocate decoding and IP resources to handle the terminating side of the call.
6. The terminating MGC 109 signals (e.g., SS7) the terminating PSTN network 113 to terminate a call to the terminating PSTN phone 115.
7. The originating MG 107 encodes voice stream into IP packets and transmits (e.g., utilizing Real Time Protocol (RTP)) the IP packets over a data network (e.g., Internet) 119 to the terminating MG 111, where the terminating MG 111 decodes the packets into a voice stream and presents the stream to the terminating PSTN network 113 which carries it to the terminating PSTN phone 115.

In the basic call flow, once a call is established, the originating and terminating MGs 107/111 generally encode and decode the voice stream with a common codec (coder/decoder) algorithm stored within codec modules 117 and 118 located within MGs 107 and 111, respectively, throughout the duration of the call. With the application of the invention, the codec algorithm in use can be changed during the call by the person who originated the call.

Figure 2:
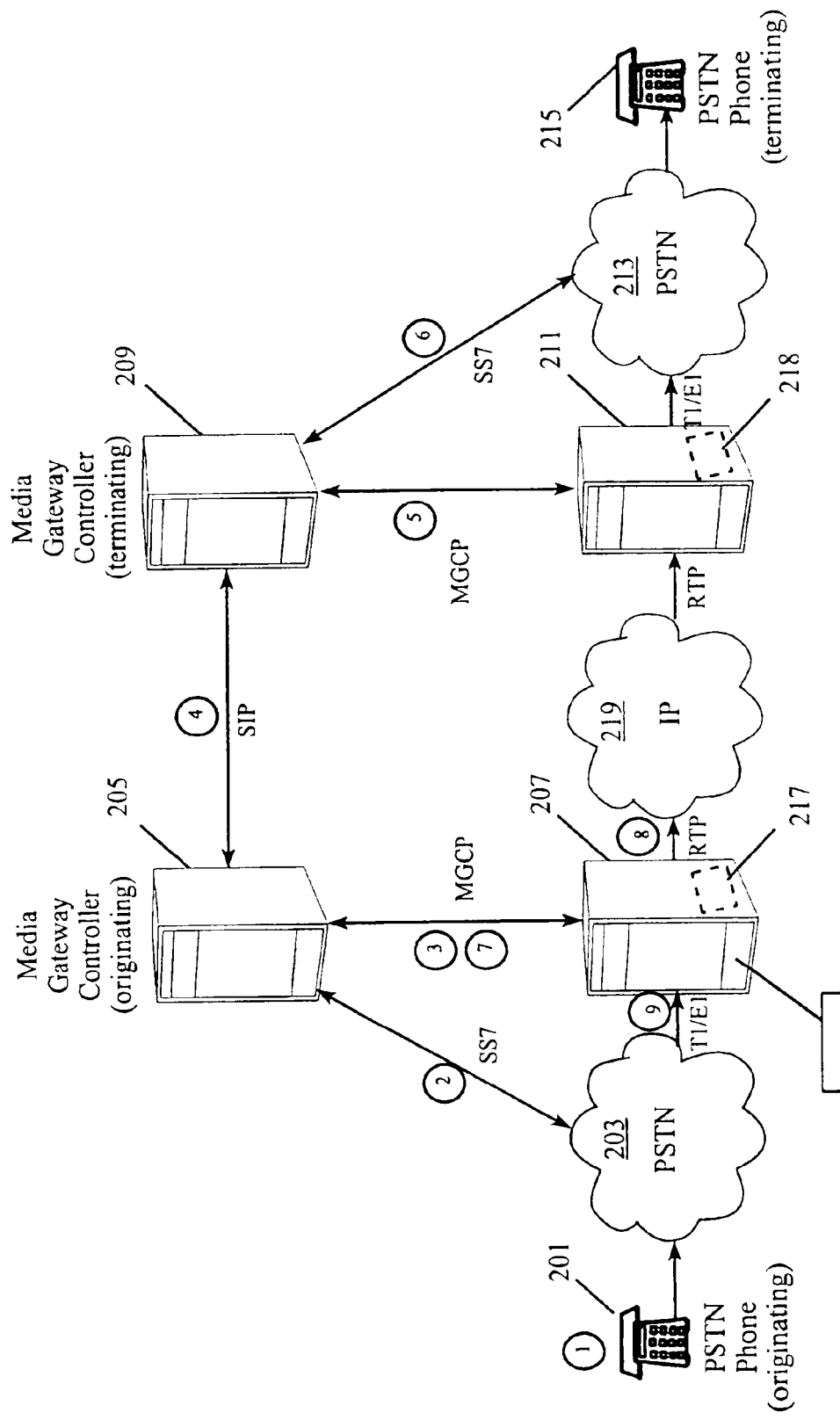
FIG. 2 illustrates voice over IP call flow and environment wherein a change in QoS is specified.

Referring to FIG. 2, signaling and voice paths are shown where the steps that are generally needed in order for the caller to change the codec 217 during the call are implemented. The following steps are followed during call setup:

1. A user dials a number from originating PSTN phone 201.
2. The PSTN network 203 on the originating side signals the originating Media Gateway Controller (MGC) 205.
3. The originating MGC 205 signals the originating Media Gateway (MG) 207 instructing it to allocate encoding and IP resources to handle the originating side of the call.
4. The originating MGC 205 signals the terminating MGC 209 to set up the terminating side of the call.
5. The terminating MGC 209 signals the terminating MG 211 instructing it to allocate decoding and IP resources to handle the terminating side of the call.
6. The terminating MGC 211 signals the terminating PSTN network 213 to terminate a call to the terminating PSTN phone 215.
7. The originating MGC 205 signals the originating MG 207 instructing the MG 207 to notify the MGC 205 if the originating caller dials the change QoS key sequence on the phone 201.
8. The originating MG 207 encodes the voice stream into IP packets and transmits the IP packets to the terminating MG 211. The terminating MG 211 decodes the packets into a voice stream and presents the stream to the terminating PSTN network 213 which carries it to the terminating PSTN phone 215.
9. Once the call is established, the originating MG 207 monitors for the originating caller's entry of the change QoS key sequence.

Assuming the above steps were followed, the originating MG 207 may monitor for caller entered command (e.g., keystrokes) indicating he or she wants to change QoS.

When the caller enters the specified keystrokes, the QoS for the call is changed in the following way:

1. The originating MG 207 receives the user's dialed change QoS key sequence (e.g., a sequence such as "##4").
2. The originating MG 207 signals the originating MGC 205 that "##4" has been entered.
3. The originating MGC 205 interprets the, "##4" to mean "change quality of -service, to level four" and signals the, originating MG 207 to change the codec algorithm within codec module 217 to a codec algorithm that is supported by the receiving MG 211 codec module 218 (e.g, that is of "level four"). The mapping from "level four" to one of the available codecs algorithms should be implementation dependant.
4. The originating MG 207 changes the codec algorithm and continues transmitting media packets to the terminating MG 211.
5. The terminating MG 211 determines the new codec algorithm from data contents of the packets it is receiving. It changes codec algorithm within codec module 218 to match and the call continues with the, new codec algorithm implemented by codec module 217.

By further example, a long distance carrier may accept calls from the PSTN and carry them across an IP network. By default, the calls are generally at the lowest QoS available and at the cheapest rate. After the call is connected, the caller may upgrade the QoS by entering a code (e.g., "##n") at the terminal keypad. Once the user changes QoS, they can be billed at a higher rate for the duration of the call (or until the QoS is reduced).

Monitoring for caller commands is provided via a DTMF (dual tone multifrequency) monitoring module that may be associated with the MG 207. The DTMF module monitors the caller line for DTMF commands. Monitoring of the callers line may be continuous, which is resource intensive, or upon a caller invoked flash signal prior to entering commands at the terminal 201 keypad.

How an originating MG would monitor for the change QoS key sequence and signal the originating MGC with the received keys has been described. Alternatively, the MGC could instruct the MG at the beginning of the call how to handle the change QoS key sequence when the MG detects it. The MG would then perform the required action when it detects the QoS key sequence, and not signal the MGC.

In addition to simply changing the codec in use, the originating MG can be instructed to set a Type of Service (ToS) value in the IP packets it is sending to the terminating MG. For purposes of the following claims of the invention, QoS should be interpreted to also mean ToS. Routers in the IP network can interpret the ToS value to give priority to certain packets so they arrive at the MG more reliably. Giving the foregoing teachings, it should be appreciated that the invention is widely applicable. For example, in a 3G digital cellular network, the caller (or the receiver) may choose to upgrade (or downgrade) the QoS used by the air interface. By upgrading, the caller uses more air resources, but pays a premium. By downgrading, the caller uses less air resources, but pays a lesser rate.

What is claimed is:

1. A method for changing Quality of Service for voice connection over Internet Protocol (VoIP) communications wherein said connection uses a first codec algorithm, comprising:

caller invoked signaling of a network controller that a change in Quality of Service is desired during an ongoing voice over Internet Protocol communication; and system implementation of a change in Quality of Service through packetization or depacketization of a communication using a different codec algorithm for said ongoing connection in response to the caller invoked signaling, wherein a choice of at least two codec algorithms are available to a subscriber for packetization and de-pecketization of communications and wherein said subscriber selects one of said at least two codec algorithms for said change.

2. The method of claim 1 wherein a subscriber signals a network controller that a change in Quality of Service is desired by entering Dual Tone Multi-Frequency commands that are received by a controller.

3. The method of claim 2, wherein Dual Tone Multi-Frequency commands are received as tones by a Dual Tone Multi-Frequency monitor seized during subscriber communication.

4. The method of claim 3 wherein Dual Tone Multi-Frequency monitoring is invoked via a subscriber flash signal.

5. The method of claim 4 wherein the flash signal causes a Dual Tone Multi-Frequency monitor to be seized during subscriber communication.

6. The method of claim 5, wherein the Dual Tone Multi-Frequency monitor monitors the subscriber's line of communication for Dual Tone Multi-Frequency tones generated by the subscriber at a subscriber terminal.

7. The method of claim 6, wherein the Dual Tone Multi-Frequency tones allow subscriber to select a Quality of Service.

8. The method of claim 7, wherein the Quality of Service is carried out via a codec algorithm.

9. A method for changing the Quality of Service during an ongoing voice over Internet Protocol communication, comprising the steps of:

monitoring a subscriber line for a subscriber originated request for a change in QoS;

receiving a subscriber request for a change in Quality of Service wherein subscriber generated control signal is received by a controller, said control signal representing the subscriber's request that a change in Quality of Service is desired for said ongoing communication; and converting subscriber communication from packetized Internet Protocol communication to unpacketized voice communication, wherein a choice of at least two codec algorithms are available to a subscriber for packetization and de-packetization of packets for said ongoing voice over Internet Protocol communication, and the subscriber chooses one of said codec algorithms through said generated control signal.

10. The method of claim 9, wherein Dual Tone Multi-Frequency commands are received as tones by a Dual Tone Multi-Frequency monitor seized during subscriber communication.

11. The method of claim 10, wherein Dual Tone Multi-Frequency monitoring is invoked via a subscriber flash signal.

12. The method of claim 10, wherein the flash signal causes a Dual Tone Multi-Frequency monitor to be seized during subscriber communication.

13. The method of claim 12, wherein the Dual Tone Multi-Frequency monitor monitors the subscriber's line of communication for Dual Tone Multi-Frequency tones generated by the subscriber at a subscriber terminal.

14. The method of claim 13, wherein the Dual Tone Multi-Frequency tones allow subscriber to select a Quality of Service.

15. A system for changing Quality of Service associated with a particular ongoing connection over voice over Internet Protocol communications wherein said particular connection uses a first codec algorithm for packetizing and depacketizing voice associated said connection into packets, comprising:

a signal monitoring module for monitoring subscriber inputs representing requests for a Quality of Service change; and a controller for implementing subscriber inputs representing requests for a Quality of Service change wherein said change is provided by packetizing and depacketizing voice associated with said ongoing connection into packets using a different codec algorithm, wherein the signal monitoring module is monitoring a subscriber line of communication for a subscriber signal selecting one of said at least two codec algorithm choices to be used for said ongoing communication.

16. The system of claim 15, wherein the signal monitoring module is a Dual Tone Multi-Frequency monitor.

17. The system of claim 16, wherein the Dual Tone Multi-Frequency monitor is seized during subscriber communication.

* * * * *

UNITED STATES PATENT AND TRADEMARK OFFICE
CERTIFICATE OF CORRECTION

| | | |
|---|---|---|
| PATENT NO. | : 6,947,385 B2 | Page 1 of 1 |
| APPLICATION NO. | : 10/807939 | |
| DATED | : September 20, 2005 | |
| INVENTOR(S) | : Havens | |

It is certified that error appears in the above-identified patent and that said Letters Patent is hereby corrected as shown below:

In Column 6, Line 13, Claim 9, delete "intemet" and insert -- internet --, therefor.

Signed and Sealed this

Twentieth Day of November, 2007

JON W. DUDAS
*Director of the United States Patent and Trademark Office*